United States Patent
White et al.

(10) Patent No.: US 10,797,890 B2
(45) Date of Patent: Oct. 6, 2020

(54) PROVIDING INTER-ENTERPRISE DATA COMMUNICATIONS BETWEEN ENTERPRISE APPLICATIONS ON AN ELECTRONIC DEVICE

(71) Applicant: BlackBerry Limited, Waterloo (CA)

(72) Inventors: Johnathan George White, St. Albans (GB); Siavash James Joorabchian Hawkins, Tonbridge (GB); Fraser George Stewart, London (GB)

(73) Assignee: BlackBerry Limited, Waterloo, Ontario (CA)

(*) Notice: Subject to any disclaimer, the term of this patent is extended or adjusted under 35 U.S.C. 154(b) by 301 days.

(21) Appl. No.: 15/905,394

(22) Filed: Feb. 26, 2018

(65) Prior Publication Data
US 2019/0268167 A1    Aug. 29, 2019

(51) Int. Cl.
*H04L 9/32* (2006.01)
*G06F 9/54* (2006.01)
(Continued)

(52) U.S. Cl.
CPC ............ *H04L 9/3268* (2013.01); *G06F 9/547* (2013.01); *G06F 21/335* (2013.01);
(Continued)

(58) Field of Classification Search
CPC . H04L 9/3268; H04L 63/0823; H04L 9/3213; G06F 21/335; G06F 21/6218; G06F 9/547; H04W 12/0806; H04W 12/0609
(Continued)

(56) References Cited

U.S. PATENT DOCUMENTS 8,656,016 B1    2/2014  Bender et al.
10,341,304 B1*  7/2019  Boutros .............. G06F 21/6218
(Continued)

FOREIGN PATENT DOCUMENTS

EP    3242242    11/2017

OTHER PUBLICATIONS

Extended European Search Report issued in European Application No. 19157183.5, dated Jun. 28, 2019, 5 pages.
(Continued)

*Primary Examiner* — Mohammad W Reza
(74) *Attorney, Agent, or Firm* — Fish & Richardson P.C.

(57) ABSTRACT

Systems, methods, and software can be used to provide inter-enterprise data communications between enterprise applications on an electronic device. In some aspects, a method comprises: receiving, by a bridge application executing on an electronic device, an interoperation request for a first enterprise, wherein the interoperation request includes a first token and a second token; sending, from the bridge application to an application of the first enterprise, the first token, wherein the application of the first enterprise executes on the electronic device; receiving, by the bridge application from the application of the first enterprise, a certificate in response to the first token, wherein the certificate is encrypted by the second token; decrypting, by the bridge application, the certificate by using the second token; and validating, by the bridge application, the application of the first enterprise based on the decrypted certificate.

17 Claims, 4 Drawing Sheets

(51) Int. Cl.
    *H04W 12/06*     (2009.01)
    *H04W 12/08*     (2009.01)
    *G06F 21/62*     (2013.01)
    *G06F 21/33*     (2013.01)
    *H04L 29/06*     (2006.01)

(52) U.S. Cl.
    CPC ........ *G06F 21/6218* (2013.01); *H04L 9/3213* (2013.01); *H04L 63/0823* (2013.01); *H04W 12/0609* (2019.01); *H04W 12/0806* (2019.01)

(58) Field of Classification Search
    USPC ........................................................ 713/158
    See application file for complete search history.

(56) References Cited

U.S. PATENT DOCUMENTS

| | | |
|---|---|---|
| 2014/0282869 A1 | 9/2014 | Dabbiere |
| 2017/0063838 A1* | 3/2017 | Yin ..................... H04L 63/0823 |
| 2017/0177892 A1 | 6/2017 | Tingstrom et al. |
| 2019/0081798 A1* | 3/2019 | Fu .......................... H04L 9/321 |

OTHER PUBLICATIONS

Communication under Rule 71(3) EPC issued in European Application No. 19157183.5 dated Nov. 27, 2019, 7 pages.

\* cited by examiner

PROVIDING INTER-ENTERPRISE DATA COMMUNICATIONS BETWEEN ENTERPRISE APPLICATIONS ON AN ELECTRONIC DEVICE

TECHNICAL FIELD

The present disclosure relates to providing inter-enterprise data communications between enterprise applications on an electronic device.

BACKGROUND

In some cases, electronic devices, including mobile devices or other computer systems, enable users to run applications on the electronic devices. The applications may access application data stored on the electronic devices.

DESCRIPTION OF DRAWINGS

Like reference numbers and designations in the various drawings indicate like elements.

DETAILED DESCRIPTION

Figure 1:
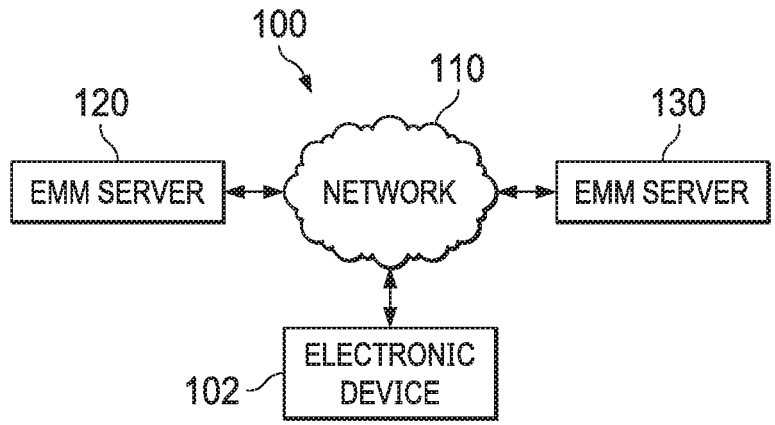
FIG. 1 is a schematic diagram showing an example communication system that provides inter-enterprise data communications between enterprise applications on an electronic device, according to an implementation.

In some cases, resources on the electronic devices, including mobile devices or other computing systems, are segmented into different containers to manage access to these resources. For example, an electronic device can have one or more personal containers for a user's personal data and applications. The electronic device can also have one or more enterprise containers for a user's enterprise data and applications. Using containers to manage resources on an electronic device can help enterprises reduce the risk that enterprise resources may be accessed by, for example, malicious or vulnerable applications. For example, enterprises can give users the freedom to install their personal application in a personal container, while controlling access to resources associated with an enterprise container. In some cases, a container can be referred to as a "profile," a "perimeter," or a "workspace."

In general, containers can be implemented as groups of resources having a common management scheme, where each container generally includes one or more resources and one or more policies regarding use of or access to the one or more resources. Containers can be implemented on data communication systems that include a device and can be used to logically separate resources, e.g., files, applications, network connections, data, on the device. For example, the device can implement two or more containers, which can include a personal container, an enterprise container, or a combination of these and other types of containers. In some implementations, the device may include multiple personal containers, multiple enterprise containers, or both. A personal container can be managed by a device user, and an enterprise container can be managed by an enterprise or corporate administrator, e.g., using an enterprise mobility management (EMM) server. In some implementations, the enterprise or corporate administrator can additionally manage the personal container, the device, or both.

In some implementations, each container on a device (e.g., enterprise or personal) has its own file system on the device, and separation between containers can be provided, at least partially, by the separation of the file systems on the device. In some cases, some of the resources of each container (e.g., data and policies) are stored in a dedicated file system for the container, while other resources of each container (e.g., applications) are stored outside of the dedicated file system.

Separation of file systems can be logical, physical, or both. A physical separation of file systems can be implemented, for example, by designating physically separate memory locations (e.g., separate memory devices or separate blocks in the same memory) for each file system. A logical separation of file systems can be implemented, for example, by designating logically separate data structures (e.g., separate directories) for each file system. In some implementations, each file system has its own encryption parameters. For example, the file system for a corporate container can have its own encryption key and a higher encryption strength, while a file system for a personal container can have its own encryption key and lower encryption strength. In some instances, the file system for the personal container has the same encryption strength as the corporate container, or the file system for the personal container can be unencrypted.

As described above, a container can include a group of resources that share a common management scheme governing the use of resources in the group and can encompass both the resources and the management policies that describe how the resources may be used. The management policies can include security policies, which can be defined for the container. Applications executable by the device can include resources that, when executed, request access to other resources or provide resources to other applications (or both). For an application that is assigned to, stored in, or associated with a container, resources included in the application can be included in the group of resources in the container. Furthermore, security policies defined for the container can restrict the application to resources included in the group. Thus, when the application is executed within the container, security policies included in the management policies of the container can determine whether or not the resources associated with the application can access other resources, such as resources included in the group or resources outside the group (or both). The security policies included in the management policies of the container can also determine whether or not to grant access to other applications, such as applications assigned to or associated with the container, or applications not assigned to or not associated with the container.

In some implementations, security policy of an enterprise container, enterprise application, or both, can be configured by an enterprise mobility management (EMM) server. The EMM server can configure a policy so that enterprise applications controlled by the EMM server (e.g., within the same enterprise container) can share data, but enterprise applications controlled by other EMM servers (e.g., in a different enterprise container) are prevented from accessing data of its enterprise application. While such a security policy prevents sensitive enterprise data from exposure to malicious applications from other sources, it also creates inconvenience for legitimate enterprises to share data.

In some cases, inter-enterprise data communication can be provided by a bridge application on an electronic device. The bridge application can be managed by a second EMM server as an enterprise application of the second enterprise. A first EMM server that manages security and access for the first enterprise can generate a first token and a second token and send both tokens to the second EMM server. The second EMM server can forward the tokens to the bridge application on the electronic device. The bridge application can request a certificate for the first enterprise using the first token, which enables the first EMM server to validate the bridge application. The bridge application can also use the second token to decrypt the encrypted certificate from enterprise applications of the first enterprise, and thereby validate the enterprise applications of the first enterprise. If both validations are successful, the bridge application can act as an intermediary between enterprise applications of the first enterprise and the second enterprise for data communications. FIGS. 1-5 and associated descriptions provide additional details of these implementations.

FIG. 1 is a schematic diagram showing an example communication system 100 that provides inter-enterprise data communications between enterprise applications on an electronic device, according to an implementation. At a high level, the example communication system 100 includes an electronic device 102 that is communicatively coupled with a first enterprise mobility management (EMM) server 120 and a second EMM server 130, over a network 110.

An EMM server, e.g., the first EMM server 120 and second EMM server 130, represents an application, a set of applications, software, software modules, hardware, or any combination thereof that can be configured to manage applications and devices for a respective enterprise. The EMM server can install, update, and manage the license of enterprise applications. In some cases, the EMM server can be located on the premises of the enterprise, behind a firewall, or a combination thereof. In some cases, the EMM server can be configured to provision an enterprise service in a cloud. In some implementations, the EMM server can generate security tokens and validate bridge applications for inter-enterprise data communications. FIGS. 2-5 and associated descriptions provide additional details of these implementations.

The example communication system 100 includes the network 110. The network 110 represents an application, set of applications, software, software modules, hardware, or combination thereof that can be configured to transmit data messages between the entities in the system 100. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

The electronic device 102 includes enterprise applications from different enterprises, e.g., the first enterprise corresponding to the first EMM server 120 and the second enterprise corresponding to the second EMM server 130. The electronic device 102 further includes a bridge application that provides inter-enterprise data communications for the enterprise applications of these different enterprises. FIGS. 2-5 and associated descriptions provide additional details of the electronic device 102 and the inter-enterprise data communication procedures.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
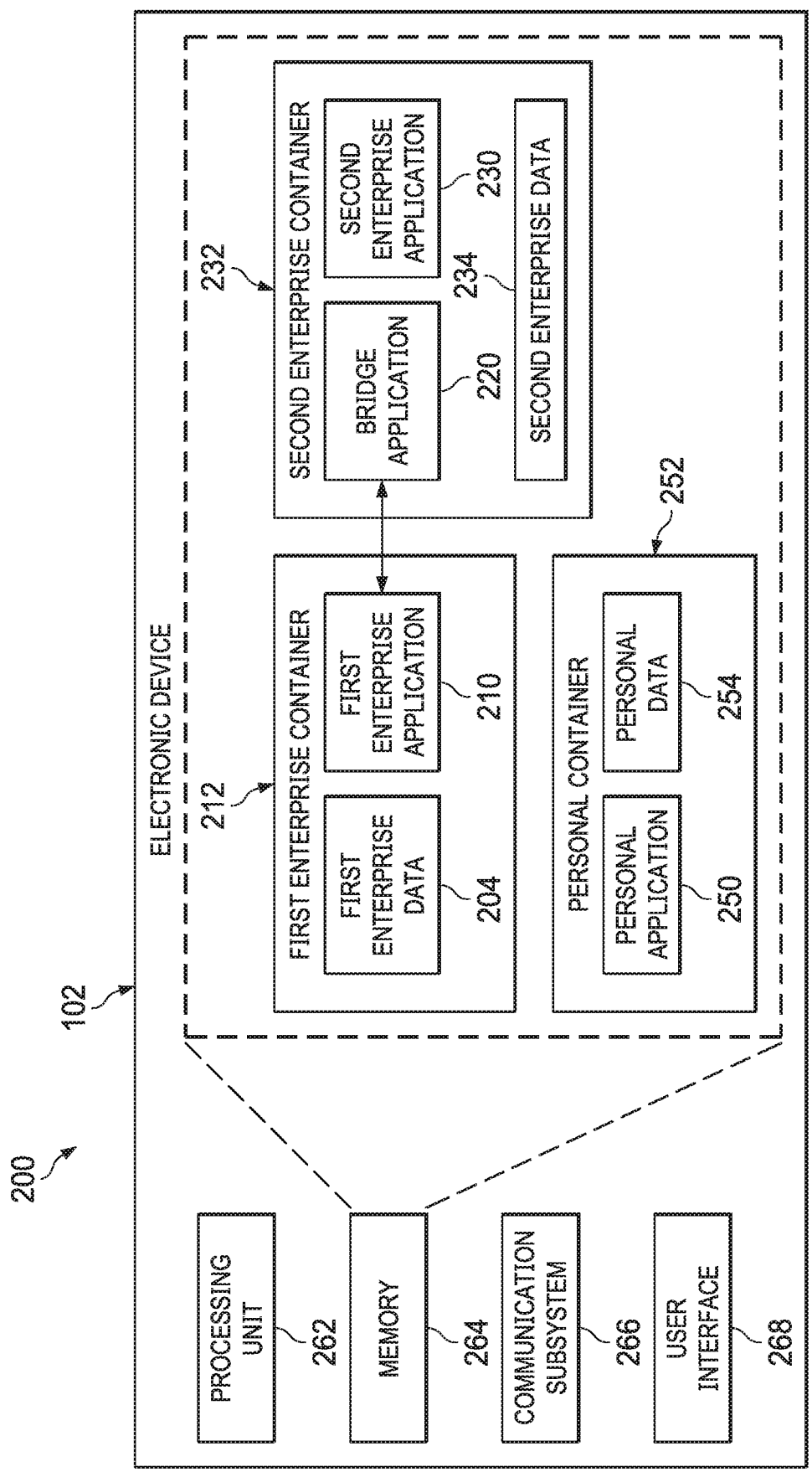
FIG. 2 is a schematic diagram showing an example electronic device that provides inter-enterprise data communications between enterprise applications, according to an implementation.

FIG. 2 is a schematic diagram 200 showing an example electronic device 102 that provides inter-enterprise data communications between enterprise applications, according to an implementation. The electronic device 102 includes a processing unit 262, a communication subsystem 266, a user interface 268, and memory 264. A mobile device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

Figure 4:
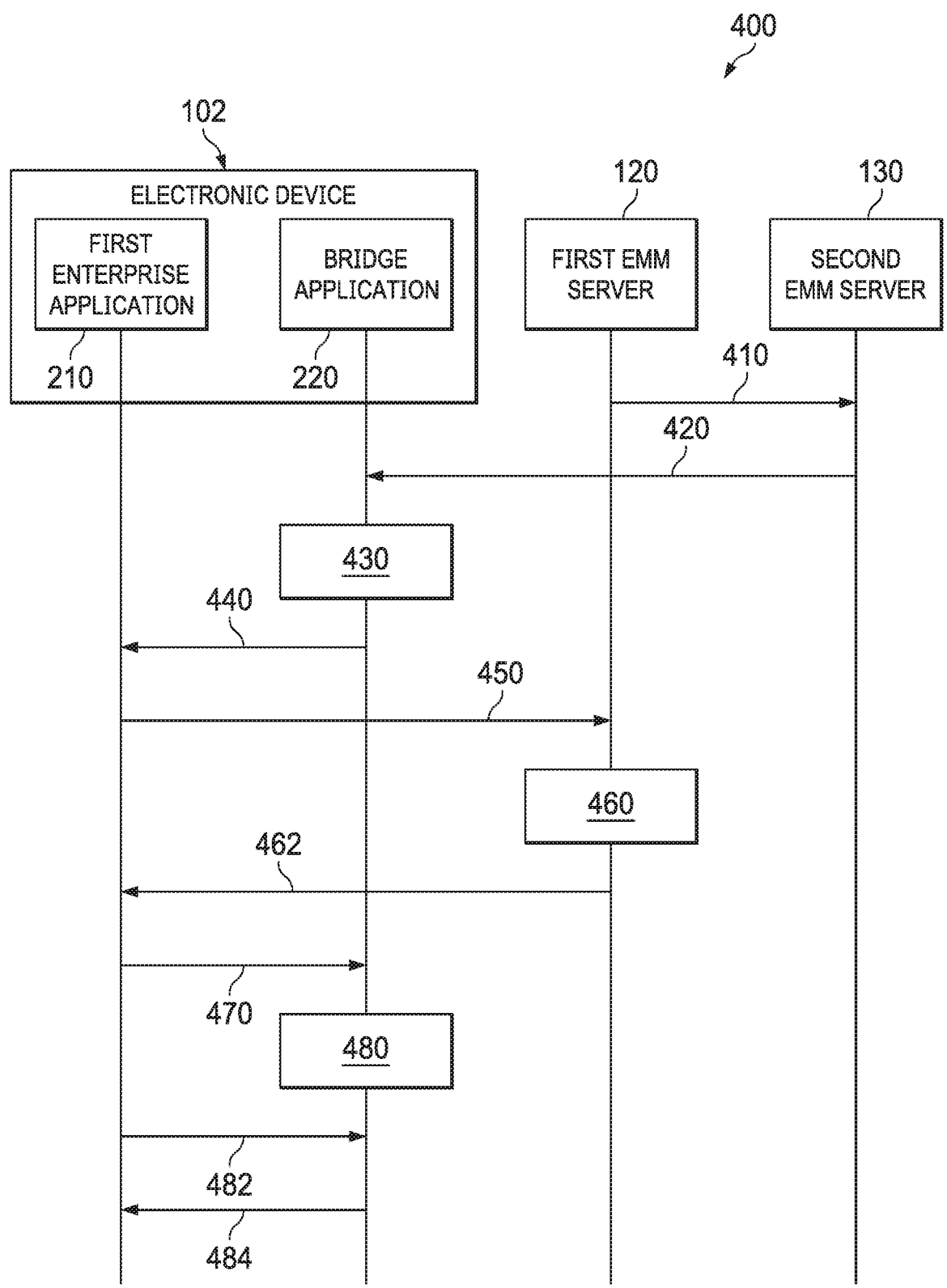
FIG. 4 is a flow diagram showing an example process for providing inter-enterprise data communications between enterprise applications on an electronic device, according to an implementation.

The example user interface 268 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. In some cases, the user interface 268 can be used to receive user input for authorizations and authentication credentials. FIG. 4 and associated descriptions provide additional details of these implementations. The user interface 268 can also include I/O interface, for example, a universal serial bus (USB) interface.

The example memory 264 can be a computer-readable storage medium on the electronic device 102. Examples of the memory 264 include volatile and non-volatile memory, magnetic media, optical media, random access memory (RAM), read-only memory (ROM), removable media, and others. The memory 264 can store an operating system (OS) of the electronic device 102 and various other computer-executable software programs for performing one or more of the processes, steps, or actions described above.

The memory 264 can store applications, data, operation system, and extensions for the electronic device 102. As illustrated, the memory 264 includes a first enterprise container 212, a second enterprise container 232, and a personal container 252. The first enterprise container 212 includes a first enterprise application 210 and first enterprise data 204. The second enterprise container 232 includes a second enterprise application 230 and second enterprise data 234. The personal container 252 includes a personal application 250 and personal data 254.

Containers, e.g., the first enterprise container 212, the second enterprise container 222, and the personal container 252, can logically separate resources, including e.g., applications, data, network access resources, configuration files, such that resources in a given container can, in some instances, be prevented from accessing resources included in a different container. For example, the personal application 250 in the personal container 252 may be prevented from accessing first enterprise data 204 in the first enterprise container 212 or second enterprise data 234 in the second enterprise container 232. Similarly, the first enterprise application 210 may be prevented from accessing second enterprise data 234 in the second enterprise container 232 or personal data 254 in the personal container 252.

The second enterprise container also includes a bridge application 220, as will be described in more detail in FIG. 4 and associated descriptions, the bridge application 220 can be used to provide inter-enterprise data communications between the first enterprise container 212 and the second enterprise container 232.

In some instances, individual containers can be added, deleted, or modified. An owner of the electronic device 102 may have the ability to add or remove individual containers from the electronic device 102. In some implementations, a user can create one or more containers. In some instances, an enterprise can send the device information identifying the initial resources (e.g., applications, policies, configurations, etc.) for a new container. A container's administrator may assign security policies for the container(s) and initiate container updates. In some implementations, container administrators can remotely lock or wipe a container. In some cases, an EMM server of an enterprise can manage a container of the respective enterprise on the electronic device 102. The EMM server can create and delete a container of the respective enterprise, install, update, and remove enterprise applications in the container of the respective enterprise, and configure security policy of the container of the respective enterprise.

Data, e.g., the first enterprise data 204, the second enterprise data 234, and the personal data 254, can include various types of data, e.g., files, classes, frameworks, backup data, business objects, jobs, web pages, web page templates, database tables, repositories storing business or dynamic information, and other information including parameters, variables, algorithms, instructions, rules, constraints, or references thereto. The data may include information that is associated with an application, a network, a user, and other information.

The first enterprise application 210, the second enterprise application 230, and the personal application 250 can include programs, modules, scripts, processes, or other objects that can execute, change, delete, generate, or process application data. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, ANDROID, iOS, or Microsoft's .NET. Further, while illustrated as internal to the electronic device 102, one or more processes associated with an application may be stored, referenced, or executed remotely. For example, a portion of an application may be an interface to a web service that is remotely executed. Moreover, an application may be a child or sub-module of another software module (not illustrated). Furthermore, while illustrated as a single first enterprise application 210, second enterprise application 230, and personal application 250, each container can include more than one respective application.

The bridge application 220 represents an application, set of applications, software, software modules, hardware, or any combinations thereof that can be configured to provide inter-enterprise data communications between the first enterprise container 212 and the second enterprise container 232. As illustrated, the bridge application 220 resides in the second enterprise container 232, and thus is configured and managed by the second enterprise. In operation, the bridge application 220 can receive tokens from an EMM server associated with the second enterprise and generates a certificate request for the first enterprise. The bridge application 220 can use the certificate to validate the first enterprise application 210, and provides inter-enterprise data communications between the first enterprise application 210 and the second enterprise application 230. FIG. 4 and associated descriptions provide additional details of these implementations.

In some cases, one enterprise container can have only one enterprise application. In these cases, each enterprise application represents a different enterprise container. In some cases, instead of grouping applications (for example, the first enterprise application 210 and second enterprise application 230) in their respective enterprise container as illustrated in FIG. 2, the electronic device 102 can segment data usage for each application by including the enterprise container in each application. For example, an application can include a first enterprise container that manages data access for the first enterprise, and a second enterprise container that manages data access for the second enterprise. In these cases, a bridge application can also be used to manage inter-enterprise data communications for these two enterprise containers within the same application.

Turning to a general description, the electronic device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

While elements of FIG. 2 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 3:
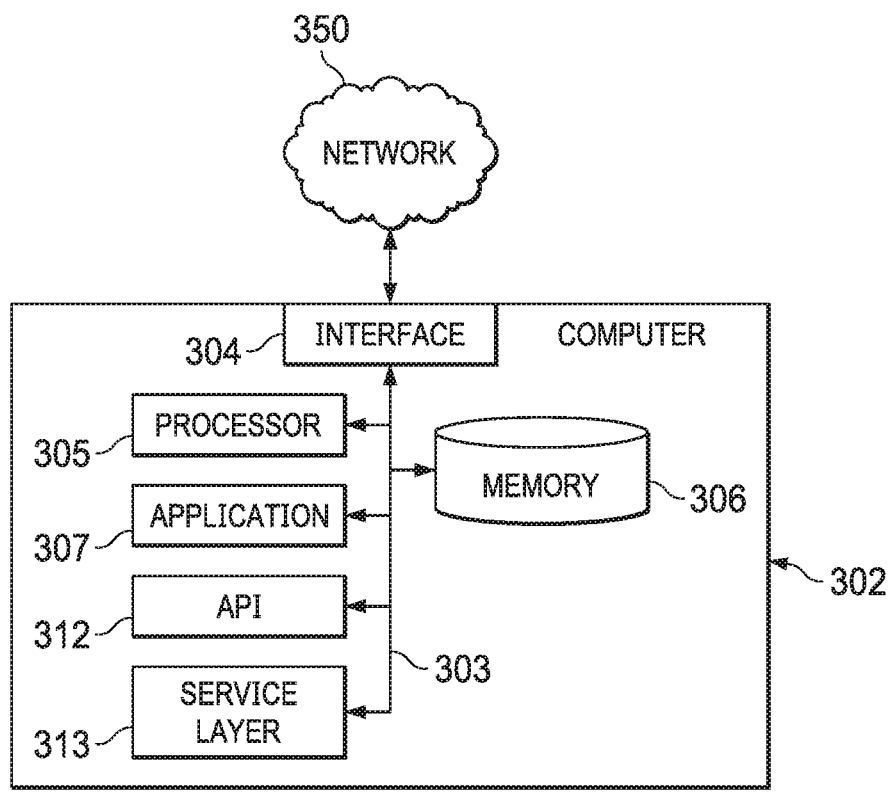
FIG. 3 is a high-level architecture block diagram showing a server coupled with a network, according to an implementation.

FIG. 3 is a high-level architecture block diagram showing a server 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the server 302 and other devices. The network 350 can be a wireless or a wireline network, a memory pipe, a hardware connection, or any internal or external communication paths between the components.

The server 302 includes a computing system configured to perform the algorithm described in this disclosure to process resource requests. For example, the server 302 can be used to implement the first EMM server 120, the second EMM server 130, or any combinations thereof shown in FIG. 1. In some cases, the algorithm can be implemented in an executable computing code, e.g., C/C++ executable codes. Alternatively, or in combination, the algorithm can be implemented in an application program, e.g., EXCEL. In some cases, the server 302 can include a standalone Linux system that runs batch applications. In some cases, the server 302 can include mobile or personal computers that run the application program.

The server 302 may include an input device, such as a keypad, keyboard, touch screen, microphone, speech recognition device, or another device that can accept user information, and/or an output device that conveys information associated with the operation of the server 302, including digital data, visual and/or audio information, or a GUI.

The server 302 can serve as a client, network component, a server, a database or other persistency, or the like. In some implementations, one or more components of the server 302 may be configured to operate within a cloud-computing-based environment.

At a high level, the server 302 can comprise an electronic computing device operable to receive, transmit, process, store, or manage data and information. According to some implementations, the server 302 may also include or be communicably coupled with an application server, e-mail server, web server, caching server, streaming data server, business intelligence (BI) server, and/or other server.

The server 302 can receive requests over network 350 from a client application (e.g., executing on a user device) and respond to the received requests by processing said requests in an appropriate software application. In addition, requests may also be sent to the server 302 from internal users (e.g., from a command console or by another appropriate access method), external or third parties, other automated applications, as well as any other appropriate entities, individuals, systems, or computers.

Each of the components of the server 302 can communicate using a system bus 303. In some implementations, any and/or all the components of the server 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the server 302. The functionality of the server 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the server 302, alternative implementations may illustrate the API 312 and/or the service layer 313 as stand-alone components in relation to other components of the server 302. Moreover, any or all parts of the API 312 and/or the service layer 313 may be implemented as child or sub-modules of another software module, enterprise application, or hardware module, without departing from the scope of this disclosure.

The server 302 includes an interface 304. Although illustrated as a single interface 304 in FIG. 3, two or more interfaces 304 may be used according to particular needs, configurations, or particular implementations of the server 302. The interface 304 is used by the server 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The server 302 includes a processor 305. Although illustrated as a single processor 305 in FIG. 3, two or more processors may be used according to particular needs, configurations, or particular implementations of the server 302. Generally, the processor 305 executes instructions and manipulates data to perform the operations of the server 302. In some cases, the processor 305 can include a data processing apparatus.

The server 302 also includes a memory 306 that holds data for the server 302. Although illustrated as a single memory 306 in FIG. 3, two or more memories may be used according to particular needs, configurations, or particular implementations of the server 302. While memory 306 is illustrated as an integral component of the server 302, in alternative implementations, memory 306 can be external to the server 302.

The application 307 is an algorithmic software engine providing functionality according to particular needs, configurations, or particular implementations of the server 302. Although illustrated as a single application 307, the application 307 may be implemented as multiple applications 307 on the server 302. In addition, although illustrated as integral to the server 302, in alternative implementations, the application 307 can be external to the server 302.

Further, the terms "client," "user," and other appropriate terminology may be used interchangeably, as appropriate, without departing from the scope of this disclosure. Moreover, this disclosure contemplates that many users may use one server 302, or that one user may use multiple servers 302.

FIG. 4 is a flow diagram showing an example process 400 for providing inter-enterprise data communications between enterprise applications on an electronic device, according to an implementation. The process 400 can be implemented by the electronic device 102 (including the first enterprise application 210 and the bridge application 220 that execute on the electronic device 102), the first EMM server 120 and the second EMM server 130, as shown in FIG. 1. As discussed previously in association with FIG. 1, the first EMM server 120 manages the applications, devices, and services for the first enterprise; while the second EMM server 130 manages the applications, devices, and services for the second enterprise. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 400 begins at 410, wherein the first EMM server 120 transmits an interoperation setup message to the second EMM server 130 to initiate the interoperation procedure. In some cases, the interoperation procedure can be triggered by the registration of the electronic device 102 at the first EMM server 120. Alternatively or in combination, an Information Technology (IT) administrator of the first enterprise can initiate the interoperation procedure. The IT administrator can also determine whether a particular electronic device or a user of a user of a particular electronic device can be enabled for inter-enterprise interoperation procedure. In some cases, the interoperation procedure can also be initiated by the electronic device 102. For example, the electronic device 102 can receive a user input for interoperations, and transmit a message to the first EMM server 120 to initiate the interoperation procedure. As will be discussed below, if the bridge application 220 has not been activated by the second EMM server 130, the interoperation setup message will also trigger the second EMM server 130 to activate the bridge application 220.

The interoperation setup message includes a first token and a second token. In one implementation, the first token can be a string of random data generated by the first EMM server 120. As will be discussed later, the first token represents validation data that will be used by the first EMM server 120 to authenticate the bridge application 220 on the electronic device 102. The first token can be different for each electronic device, each user or user groups of the electronic device. In some cases, the same first token can be used for the electronic devices associated with one particular enterprise.

As will be discussed later, the second token represents decryption data that will be used as an input to a decryption algorithm to decrypt information that has been encrypted. For example, the second token can be a string of random data generated by the first EMM server 120.

The interoperation setup message can also include certificate signing data associated with the first enterprise. As will be discussed later, the certificate signing data represents data that will be used to generate a certificate signing request (CSR) by the bridge application 220. In one example, the certificate signing data can include a user identifier that identifies the user of the electronic device 102 at the first enterprise. The interoperation setup message can also include application configuration information that enables the bridge application 220 to modify its user interface (UI) and procedures for a customer deployment, e.g., displaying different UI prompts to user for authorization. The application configuration information will be forwarded to the bridge application 220 at 420.

The interoperation setup message can also include information that identifies the electronic device 102 or the user of the electronic device 102. Such information can include International Mobile Subscriber Identity (IMSI), Temporary Mobile Subscriber Identity (TMSI), Universal Integrated Circuit Card (UICC) number, Subscriber Identification Module (SIM) number, or any other identity information that can be used by the second EMM server 130 to identifier the electronic device 102 for which the interoperation setup is requested.

At 420, in response to receiving the interoperation setup message, the second EMM server 130 transmits an interoperation request to the bridge application 220 executing on the electronic device 102. The second EMM server 130 can use the information that identifies the electronic device 102 or the user of the electronic device 102 discussed previously to determine the particular electronic device (i.e., the electronic device 102) to transmit the interoperation request. The interoperation setup message includes the first token, the second token, and the certificate signing data received in the interoperation setup message. In some cases, the first token, the second token, and the certificate signing data can be included in a data wrapper in the interoperation setup message so that the second EMM server 130 can forward these data to the electronic device 102 without parsing them individually. As will be discussed later, the tokens (including the first token and the second token) can be refreshed periodically. In some cases, the previous set of tokens may be used during the transition time while the tokens are being refreshed to a new set of values.

In some cases, as illustrated, the bridge application 220 has been installed on the electronic device 102 prior to step 410. Alternatively or additionally, the installation or activation of the bridge application 220 can be triggered by the interoperation setup message. For example, after receiving the interoperation setup message, the second EMM server 130 can determine whether the bridge application 220 has already been installed or activated on the electronic device 102. If the bridge application 220 has not been installed or activated, the second EMM server 130 can transmit an installation package, an activation command, or a combination thereof to the electronic device 102 to install and activate the bridge application 220.

At 430, the bridge application 220 generates a CSR that requests a certificate from the first EMM server 120. Example algorithms for generating the CSR include Public-Key Cryptography Standards (PKCS) 10 algorithm. The CSR includes the certificate signing data received at 420, for example a deployment identifier, a user ID, or a combination thereof.

At 440, the bridge application 220 sends a certificate request message to the first enterprise application 210. The first message includes the first token and the CSR. In some cases, additional validation information can be included in the certificate request message. Examples of the additional validation information can include the domain User Principal Name (UPN) of the user of the electronic device 102, other identity information of the user, an identifier of the bridge application 220, or any combinations thereof.

The first enterprise application 210 is an enterprise application for the first enterprise. In some cases, the bridge application 220 can discover the enterprise applications for the first enterprise by using a device identifier of the first enterprise. In one example, the device identifier of the first enterprise can be a random number that is generated when one enterprise application of the first enterprise is installed on the electronic device 102. A register on the electronic device 102 can register the one enterprise application of the first enterprise with the device identifier of the first enterprise. Other enterprise applications of the first enterprise will also be registered using the same the device identifier once they are installed. In some cases, the first EMM server 120 can include the device identifier of the first enterprise in the interoperation setup message at 410. The second EMM server 130 can forward the device identifier of the first enterprise in the interoperation request at 420. The bridge application 220 can use device identifier of the first enterprise to query the register and discover the enterprises applications for the first enterprise. In some cases, the register can be located on the first EMM server 120, and the bridge application 220 can query the first EMM server 120 using the device identifier to discover the enterprises applications for the first enterprise. In some cases, there may be more than one enterprise application for the first enterprise executing on the electronic device 102. In these or other cases, the bridge application 220 can select one of these enterprises applications for the first enterprise, randomly, or according to a priority algorithm configured by the first EMM server 120 or the second EMM server 130, as the first enterprise application 210 to send the first message to. Alternatively or in combination, the first EMM server 120 can designate one application as the first enterprise application 210 and include the identifier of the first enterprise application 210 in the interoperation setup message. The second EMM server 130 can include the identifier of the first enterprise application 210 in the interoperation request to the electronic device 102.

At 450, the first enterprise application 210 transmits the CSR to the first EMM server 120 to request a certificate on behalf of the bridge application. The first enterprise application 210 also transmits the first token received at 440 to the first EMM server 120. In some cases, if received at 440, the first enterprise application 210 also transmits the additional validation information (e.g., the domain UPN of second enterprise) to the first EMM server 120. The first token and the additional validation information can be transmitted in the same message as the CSR. In some cases, prior to transmitting the CSR, the first enterprise application 210 can prompt the user for authorization. For example, the first enterprise application 210 can output a user interface object and request the user to approve the interoperation procedure using a click, a swipe, a tap, or any other user inputs. In some cases, the first enterprise application 210 can further request the user to enter security credentials, e.g., password and username, to authenticate the user before the user can provide authorization. The security procedure for authorization can be configured by the first EMM server 120.

At 460, the first EMM server 120 validates the bridge application 220 by determining whether the first token received at 450 is the same as the first token that was sent at 410. If the first token received at 450 is the same as the first token that was sent at 410, then the bridge application 220 is validated at the first EMM server 120. Accordingly, the first EMM server 120 generates a certificate for the bridge application 220 and transmits the certificate to the first enterprise application 210 at 462. If the first token received at 450 is not the same as the first token that was sent at 410, then the bridge application 220 is not validated. Accordingly, the first EMM server 120 transmits a validation failure message to the first enterprise application 210 to indicate that the bridge application 220 is not validated. In some cases, in addition to the first token, the first EMM server can also use the additional validation information (e.g., the domain UPN) received at 450 to further validate the bridge application 220.

The certificate can include optional extensions to identify the certificate as being issued to a bridge application. Therefore, the certificate may be used for provisioned inter-enterprise data communications with the bridge application 220 but not for other communications.

In some cases, the first EMM server 120 encrypts the certificate and transmits the encrypted certificate at 462. The encryption can be performed using the second token, or other encryption data that is compatible with the second token so that the second token can be used to decrypt the encrypted certificate. Example of the encryption algorithms include symmetric encryption algorithms such as Advanced Encryption Standard-Counter with CBC-MAC (AES-CCM) algorithm. If the second token is not present, then plain text is transmitted at 462.

If the bridge application 220 was validated and the first enterprise application 210 receives the certificate at 462, then at 470, the first enterprise application 210 sends the certificate to the bridge application 220. If the bridge application 220 was not validated and the first enterprise application 210 receives a validation failure message at 462, then at 470, the first enterprise application 210 sends an error message to the bridge application 220.

At 480, the bridge application 220 uses the second token received at 420 to decrypt the certificate. If the decryption is successful, then first enterprise application 210 is validated at the bridge application 220 and the bridge application can send data from enterprise applications of the second enterprise to enterprise applications of the first enterprise (including, for example, the first enterprise application 210). If the decryption is not successful, then first enterprise application 210 is not validated at the bridge application 220 and the bridge application would not send data from enterprise applications of the second enterprise to enterprise applications of the first enterprise (including, for example, the first enterprise application 210).

At 482, the first enterprise application 210 sends an inter-enterprise data request to the bridge application 220 for data associated with enterprise applications of the second enterprise. The bridge application 220 validates that the first enterprise application 210 is authorized for inter-enterprise data communication based on the certificate decrypted at 480. For example, the certificate can include information of keys that can be used by the first enterprise application 210 to encrypt and sign the inter-enterprise data request, and used by the bridge application 220 to decrypt the inter-enterprise data request. Alternatively or in combination, the certificate can include information of keys that can be used to establish a secure communication channel between the first enterprise application 210 and the bridge application 220 according to the Transport Layer Security (TLS) protocols. In one example, the first enterprise application 210 and the bridge application 220 can agree with a symmetric session key that is used for encryption and decryption information exchanges between the first enterprise application 210 and the bridge application 220 using a "handshake" protocol, and the certificate can be used to authenticate that the messages during the "handshake" procedure are originated from the expected sources. In some cases, a common control server of the first enterprise can be used as a control server that signs the certificate. In some cases, the certificate can have a validation period that is the same as the validation period of the first or the second token. When the certificate expires, the bridge application 220 can initiate the process 200 to refresh the tokens and the certificate.

If the validation is successful, the bridge application 220 queries enterprise applications of the second enterprise, receive the requested data, and at 484, forward the data to the first enterprise application 210. The bridge application 220 can also second an inter-enterprise data request to the first enterprise application 210 to request data on behalf of enterprise applications of the second enterprise.

In some cases, the first token, the second token, or both can be unique to the electronic device 102 or to a user of the electronic device 102. In these or other cases, the first EMM server 120 generates one or both of the tokens for each electronic devices and maintains them accordingly. This approach provides a high level of security for these tokens. Alternatively or additionally, the first EMM server 120 generates one or both of the tokens for each enterprise (e.g., the second enterprise) that wants to establish an inter-enterprise data communication with the first enterprise, and the tokens will be the same for different electronic devices that are associated with the same enterprise. This approach provides a more efficient way of managing tokens.

In some cases, one or both tokens can have an expiration period. Once the tokens expire, process 400 will repeat to refresh these tokens. This approach provides additional security for these tokens.

Figure 5:
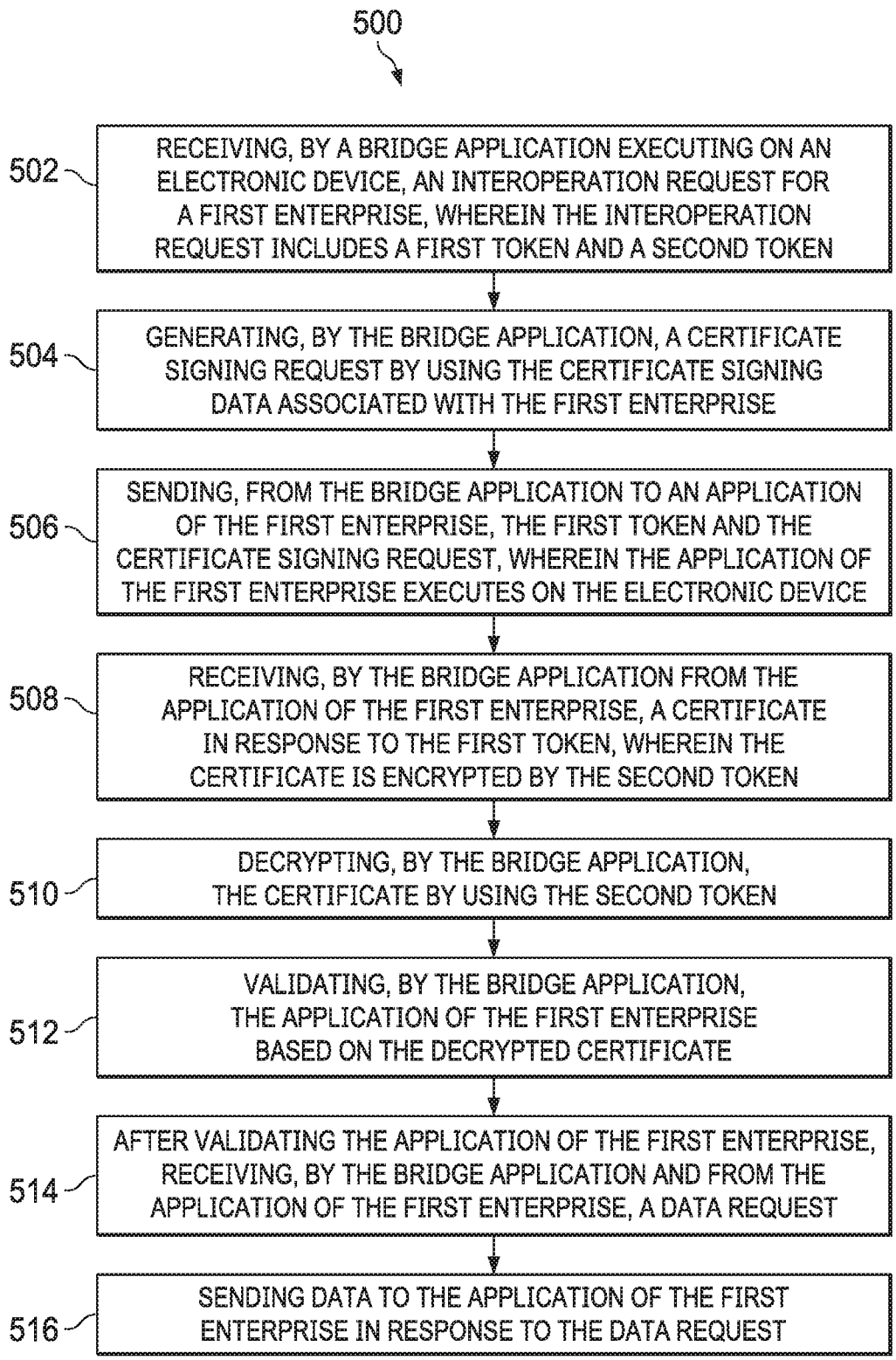
FIG. 5 is a flow diagram showing an example method for providing inter-enterprise data communications between enterprise applications on an electronic device, according to an implementation.

FIG. 5 is a flow diagram showing an example method 500 for providing inter-enterprise data communications between enterprise applications on an electronic device, according to an implementation. The method 500 can be implemented by the entities shown in FIG. 1, including, for example, the electronic device 102. The method 500 shown in FIG. 5 can also be implemented using additional, fewer, or different entities. Furthermore, the method 500 shown in FIG. 5 can be implemented using additional, fewer, or different operations, which can be performed in the order shown or in a different order. In some instances, an operation or a group of operations can be iterated or repeated, for example, for a specified number of iterations or until a terminating condition is reached.

At 502, a bridge application executing on an electronic device receives an interoperation request for a first enterprise. The interoperation request includes a first token and a second token. In some cases, the interoperation request includes certificate signing data associated with the first enterprise.

At 504, the bridge application generates a certificate signing request by using the certificate signing data associated with the first enterprise.

At 506, the bridge application sends the first token to an application of the first enterprise. The application of the first enterprise executes on the electronic device. In some cases, the bridge application also sends the certificate signing request to the application of the first enterprise.

At 508, the bridge application receives, from the application of the first enterprise, a certificate in response to the first token. The certificate is encrypted by the second token.

At 510, the bridge application decrypts the certificate by using the second token.

At 512, the bridge application validates the application of the first enterprise based on the decrypted certificate.

At 514, after validating the application of the first enterprise, the bridge application receives a data request from the application of the first enterprise.

At 516, the bridge application sends data to the application of the first enterprise in response to the data request.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A computer-implemented method for secure inter-enterprise data communications between enterprise applications on an electronic device, comprising:
   receiving, by a bridge application executing on the electronic device, an interoperation request for a first enterprise, wherein the interoperation request includes a first token and a second token, the interoperation request is received from an enterprise mobility management (EMM) server that is associated with a second enterprise, and the second enterprise is different than the first enterprise;
   in response to the interoperation request, sending, from the bridge application to an application of the first enterprise, the first token, wherein the application of the first enterprise executes on the electronic device;
   receiving, by the bridge application from the application of the first enterprise, a certificate in response to the first token, wherein the certificate is encrypted by the second token;
   decrypting, by the bridge application, the certificate by using the second token; and
   validating, by the bridge application, the application of the first enterprise based on the decrypted certificate.

2. The method of claim 1, further comprising:
   after validating the application of the first enterprise, receiving, by the bridge application and from the application of the first enterprise, a data request; and
   sending data to the application of the first enterprise in response to the data request.

3. The method of claim 1, wherein the interoperation request includes certificate signing data associated with the first enterprise.

4. The method of claim 3, further comprising:
generating, by the bridge application, a certificate signing request by using the certificate signing data associated with the first enterprise; and
sending the certificate signing request to the application of the first enterprise.

5. The method of claim 1, further comprising: sending, from the bridge application to the application of the first enterprise, a domain User Principal Name (UPN) with the first token.

6. The method of claim 1, wherein the first token or the second token has an expiration period.

7. The method of claim 1, wherein the application of the first enterprise is included in a first enterprise container of the electronic device.

8. An electronic device, comprising:
at least one hardware processor; and
a computer-readable storage medium coupled to the at least one hardware processor and storing programming instructions for execution by the at least one hardware processor, wherein the programming instructions, when executed, cause the at least one hardware processor to perform operations comprising:
receiving, by a bridge application executing on the electronic device, an interoperation request for a first enterprise, wherein the interoperation request includes a first token and a second token, the interoperation request is received from an enterprise mobility management (EMM) server that is associated with a second enterprise, and the second enterprise is different than the first enterprise;
in response to the interoperation request, sending, from the bridge application to an application of the first enterprise, the first token, wherein the application of the first enterprise executes on the electronic device;
receiving, by the bridge application from the application of the first enterprise, a certificate in response to the first token, wherein the certificate is encrypted by the second token;
decrypting, by the bridge application, the certificate by using the second token; and
validating, by the bridge application, the application of the first enterprise based on the decrypted certificate.

9. The electronic device of claim 8, the operations further comprising:
after validating the application of the first enterprise, receiving, by the bridge application and from the application of the first enterprise, a data request; and
sending data to the application of the first enterprise in response to the data request.

10. The electronic device of claim 8, wherein the interoperation request includes certificate signing data associated with the first enterprise.

11. The electronic device of claim 10, the operations further comprising:
generating, by the bridge application, a certificate signing request by using the certificate signing data associated with the first enterprise; and
sending the certificate signing request to the application of the first enterprise.

12. The electronic device of claim 8, the operations further comprising: sending, from the bridge application to the application of the first enterprise, a domain User Principal Name (UPN) with the first token.

13. The electronic device of claim 8, wherein the first token or the second token has an expiration period.

14. The electronic device of claim 8, wherein the application of the first enterprise is included in a first enterprise container of the electronic device.

15. A non-transitory computer-readable medium storing instructions which, when executed, cause an electronic device to perform operations comprising:
receiving, by a bridge application executing on the electronic device, an interoperation request for a first enterprise, wherein the interoperation request includes a first token and a second token, the interoperation request is received from an enterprise mobility management (EMM) server that is associated with a second enterprise, and the second enterprise is different than the first enterprise;
in response to the interoperation request, sending, from the bridge application to an application of the first enterprise, the first token, wherein the application of the first enterprise executes on the electronic device;
receiving, by the bridge application from the application of the first enterprise, a certificate in response to the first token, wherein the certificate is encrypted by the second token;
decrypting, by the bridge application, the certificate by using the second token; and
validating, by the bridge application, the application of the first enterprise based on the decrypted certificate.

16. The computer-readable medium of claim 15, the operations further comprising:
after validating the application of the first enterprise, receiving, by the bridge application and from the application of the first enterprise, a data request; and
sending data to the application of the first enterprise in response to the data request.

17. The computer-readable medium of claim 15, wherein the interoperation request includes certificate signing data associated with the first enterprise.

* * * * *